United States Patent
Johnson

(10) Patent No.: US 8,000,431 B2
(45) Date of Patent: Aug. 16, 2011

(54) METHOD AND COMPOSITION FOR MODERATED NUCLEAR FUEL

(75) Inventor: Gregory A. Johnson, Camarillo, CA (US)

(73) Assignee: Hamilton Sundstrad Corporation, Windsor Locks, CT (US)

( * ) Notice: Subject to any disclaimer, the term of this patent is extended or adjusted under 35 U.S.C. 154(b) by 480 days.

(21) Appl. No.: 12/274,578

(22) Filed: Nov. 20, 2008

(65) Prior Publication Data
US 2010/0123107 A1    May 20, 2010

(51) Int. Cl.
*G21C 3/00* (2006.01)

(52) U.S. Cl. ............ 376/423; 376/412; 376/409

(58) Field of Classification Search ........... 376/423, 376/412, 409
See application file for complete search history.

(56) References Cited

U.S. PATENT DOCUMENTS

| 3,043,727 | A | * | 7/1962 | Gschneidner, Jr. et al. ..... 148/95 |
| 3,081,249 | A | * | 3/1963 | Whittemore, Jr. ............. 264/0.5 |
| 3,093,563 | A | * | 6/1963 | Menke ........................... 376/348 |
| 3,119,747 | A | * | 1/1964 | Simnad et al. ................ 376/415 |
| 3,145,149 | A |   | 8/1964 | Imhoff |
| 3,145,150 | A |   | 8/1964 | Gylfe |
| 3,257,285 | A |   | 6/1966 | Clifford |
| 3,347,750 | A | * | 10/1967 | Thomas ........................ 376/419 |
| 3,627,633 | A |   | 12/1971 | Magladry |
| 4,071,587 | A |   | 1/1978 | Eggers |
| 4,127,443 | A |   | 11/1978 | Wetch |
| 4,186,050 | A | * | 1/1980 | West et al. .................... 376/403 |
| 4,493,809 | A | * | 1/1985 | Simnad ........................ 376/171 |
| 4,591,479 | A |   | 5/1986 | Weitzberg |
| 4,652,427 | A |   | 3/1987 | Uchikawa |
| 5,112,534 | A | * | 5/1992 | Guon et al. ................... 252/640 |
| 5,276,718 | A | * | 1/1994 | Ueda ............................ 376/220 |
| 5,349,618 | A |   | 9/1994 | Greenspan |
| 6,192,098 | B1 |   | 2/2001 | VanSwam |
| 2007/0283536 | A1 | * | 12/2007 | Reuter et al. ................ 23/305 R |
| 2009/0268861 | A1 | * | 10/2009 | Shayer ......................... 376/409 |

OTHER PUBLICATIONS

Arita et al., "Heat Capacity Measurment and DSC Study of Hafnium Hydrides," Journal of Thermal Analysis and Calorimetry, vol. 92, pp. 403-406, May 2008.*
"Metal Hydrides," Copyright 1968, Academic Press, Inc., William M. Mueller, James P. Blackledge, et al.

* cited by examiner

*Primary Examiner* — Rick Palabrica
(74) *Attorney, Agent, or Firm* — Carlson, Gaskey & Olds, P.C.

(57) ABSTRACT

A nuclear fuel composition includes a transuranic fuel and a neutron moderator mixed with transuranic fuel. The neutron moderator includes at least one of hafnium or zirconium.

12 Claims, 1 Drawing Sheet

METHOD AND COMPOSITION FOR MODERATED NUCLEAR FUEL

BACKGROUND OF THE INVENTION

This disclosure relates to a moderated nuclear fuel composition for providing a desired prompt negative reactivity coefficient.

Nuclear fuels used in fast reactors as breeders, actinide burners, or power reactors typically exhibit relatively small or negligible negative prompt coefficients of reactivity. One reason for this is a lack of Doppler broadening in such fuels. For instance, neutron energies in a typical nuclear fuel of a fast reactor are much greater than nuclei resonance ranges where Doppler broadening occurs. Neutron energies may be several hundred keV and Doppler broadening may occur primarily below 25 keV. As a result, the prompt coefficient of reactivity of the nuclear fuel is weak or negligible. Additionally, voiding in the surrounding coolant removes parasitic neutron absorption and causes a positive coolant void coefficient, which is generally an undesirable condition.

SUMMARY OF THE INVENTION

An example nuclear fuel composition includes a transuranic fuel and a neutron moderator mixed with transuranic fuel. The neutron moderator includes at least one of hafnium or zirconium.

In another aspect, an example nuclear fuel composition includes 8 wt %-45 wt % of the transuranic fuel and a balance being the neutron moderator. The transuranic fuel is selected from uranium, plutonium, americium, neptunium, curium and combinations thereof, and the neutron moderator includes hafnium hydride and zirconium hydride.

An example method of moderating a nuclear fuel includes mixing a transuranic fuel with a neutron moderator that includes hafnium to thereby provide a nuclear fuel composition where the hydrogen in the hafnium hydride moderates neutrons of the transuranic fuel.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figure 1:
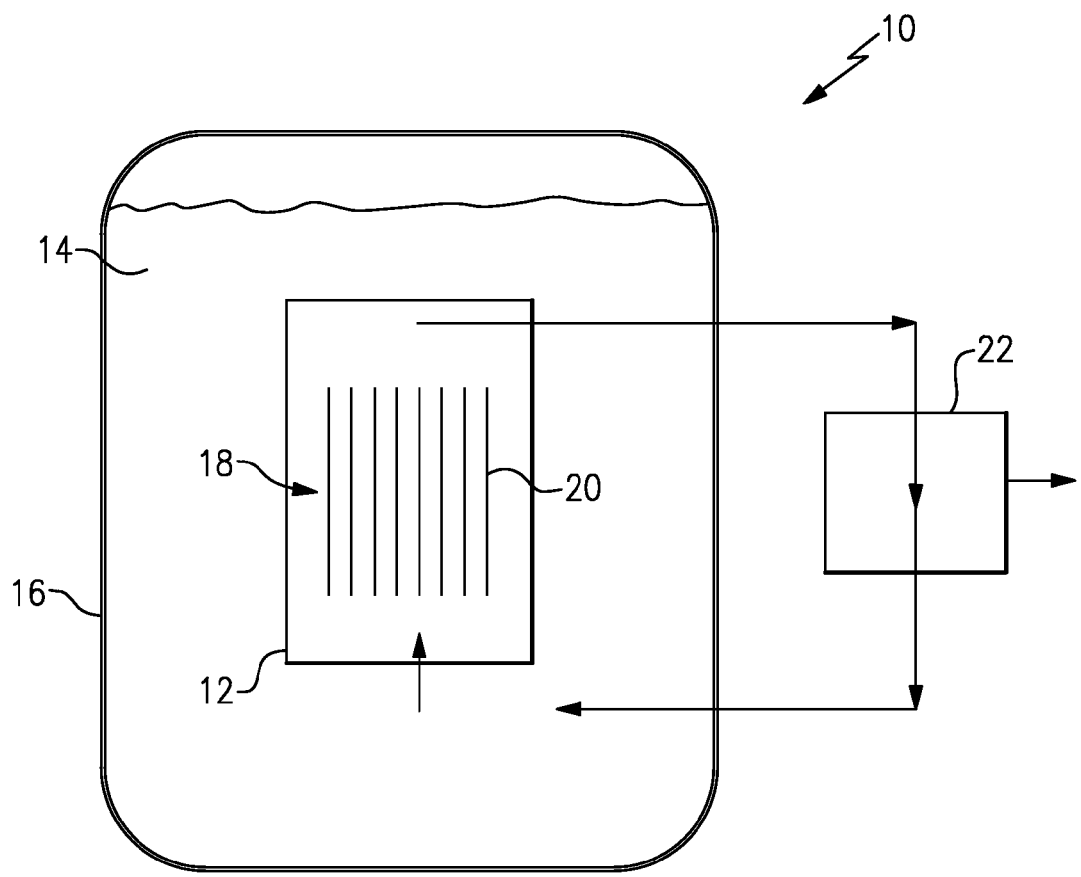
FIG. 1 schematically illustrates an example nuclear reactor system having a nuclear fuel that includes a transuranic fuel and a neutron moderator.

FIG. 1 schematically illustrates selected portions of an example nuclear reactor system 10 for power generation. However, it is to be understood that this disclosure is not limited to the arrangement of the example nuclear reactor system 10 for power generation, and the concepts disclosed herein may be applied to other reactor systems that may be used for other purposes. In the illustrated example, the nuclear reactor system 10 includes a reactor vessel 12 that is submerged within a coolant 14 (e.g., water, liquid metal, etc.) contained within a containment vessel 16. The reactor vessel 12 includes a core 18 including nuclear fuel 20 that is used to heat the coolant 14 in a known manner. For instance, the coolant 14 circulates through the reactor vessel 12, as indicated by the flow arrows, to a heat exchanger 22 that transfers heat from the coolant 14 to another working fluid, such as water. Such an arrangement may be used to produce steam for downstream power generation.

Figure 2:
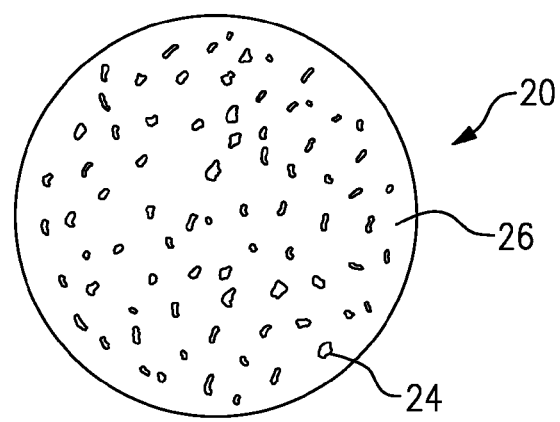
FIG. 2 is a cross-section showing a mixture of the transuranic fuel and the neutron moderator of the nuclear fuel.

In the illustrated example, the nuclear fuel 20 includes a composition for providing a strong negative prompt coefficient of reactivity and a reduction or elimination of a positive coolant void coefficient of the coolant 14. As shown in a schematic cross-section of one of the nuclear fuel 20 in FIG. 2, the nuclear fuel 20 includes a transuranic fuel 24 and a neutron moderator 26 mixed with the transuranic fuel. For instance, the transuranic fuel 24 is dispersed through a matrix of the neutron moderator 26. The transuranic fuel may be selected from uranium, plutonium, americium, neptunium, curium and combinations thereof. The neutron moderator 26 includes hafnium, zirconium, or combination thereof, which reduces a velocity of fast/high energy neutrons within the core 18 through sub-atomic collisions.

Hafnium and zirconium have a low neutron energy resonance relative to the several hundred keV of the neutrons of the transuranic fuel 24. Thus, the low resonance of the hafnium and/or zirconium in the neutron moderator 26 reduces the neutron energy spectrum of the nuclear fuel 20.

The hafnium and/or zirconium of the nuclear fuel 20 may be in the form of hydrides, such as hafnium hydride or zirconium hydride (e.g., $HfH_x$ or $ZrH_x$, where x is the atomic ratio of hydrogen to heavy metal Hf and/or Zr). The hydrogen of the hydride provides neutron moderation by slowing the velocity of fast neutrons within the core 18. The hydrogen is an effective moderator because hydrogen may reduce the velocity of a neutron in a single sub-atomic collision. Thus, the addition of the hafnium and/or zirconium with the hydrogen in the nuclear fuel 20 reduces the neutron energy spectrum of the nuclear fuel 20 from several hundred keV to a range that at least partially overlaps a Doppler broadening range below about 25 keV. As a result of the Doppler broadening, the nuclear fuel 20 exhibits a strong negative prompt coefficient of reactivity. In one example, the phenomena of Doppler broadening is caused by an apparent broadening of the energy resonances of the hafnium due to thermal motion of nuclei. That is, stationary nuclei only absorb neutrons of certain resonance energies, whereas if the nucleus is moving away from the neutron or toward the neutron, the apparent velocity of the neutron with velocities greater or less than the original absorption energy to will now undergo resonance absorption. By reducing the velocity of the neutrons using the neutron moderator 26, a sufficient number of neutrons will have energies that will overlap the Doppler broadened resonance thereby providing a negative prompt coefficient of reactivity of the nuclear fuel 20.

The negative prompt coefficient of reactivity of the nuclear fuel 20 also may limit or eliminate a positive coolant void coefficient. For instance, moderating the nuclear fuel 20 using the neutron moderator 26 may increase the negative prompt coefficient of reactivity sufficient enough to offset the positive coolant void coefficient.

In a further example, the neutron moderator 26 may include zirconium hydride and hafnium hydride. Similar to the hafnium, the zirconium has a low neutron energy resonance relative to the several hundred keV of the neutrons of the transuranic fuel 24 and thereby reduces the neutron energy spectrum of the nuclear fuel 20. However, the hafnium is thought to have a different effectiveness than the zirconium in providing a prompt negative coefficient of reactivity. Thus, the ratio of hafnium to zirconium may be controlled in the composition of the nuclear fuel 20 to establish a desired negative prompt coefficient of reactivity. For instance, a total combined weight of the hafnium hydride and the zirconium hydride may include 1 wt % of the hafnium hydride and a balance of the zirconium hydride or as much as about 99 wt % of the hafnium hydride and 1 wt % of the zirconium hydride. In other examples, the ratio of hafnium hydride to zirconium hydride may be 75/25, 50/50, 25/75, or other desired ratio, depending on a desired amount of prompt negative temperature coefficient of reactivity.

The neutron moderator 26 may additionally include a neutron moderator diluent used to reduce the amount of the neutron moderator 26. The neutron moderator diluent may be used to further control the reactivity of the nuclear fuel 20 by diluting the moderating effectiveness of the neutron moderator 26. In a few examples, the neutron moderator diluent is selected from iron, tungsten, rhenium, or mixtures thereof. The amount of neutron moderator diluent may vary, depending upon the desired reactivity of the nuclear fuel 20. In a few examples, the amount of the neutron moderator diluent may be anywhere from fractions of a weight percent of the nuclear fuel 20 up to weight percentages that are several times greater than the amount of hafnium hydride and/or zirconium hydride in the neutron moderator 26, depending on a desired degree of dilution of the hafnium hydride and/or zirconium hydride.

The transuranic fuel 24, the hafnium, the zirconium, and optionally the neutron moderator diluent of the nuclear fuel 20 may be combined using any suitable technique. For example, mixing techniques known for forming conventional nuclear fuels that include metal or metal oxide mixed with zirconium may be applied to form the example nuclear fuel 20. In this regard, the nuclear fuel 20 may be a mixture of powders of the transuranic fuel 24 and the neutron moderator 26 that are then sintered into a desired shape, such as a rod or pellet.

After combining, the transuranic fuel 24, the hafnium, and/or the zirconium of the neutron moderator 26 may be hydrided in a hydriding process (e.g., either before or after sintering). For instance, the nuclear fuel 20 may be exposed to gaseous hydrogen at an elevated temperature for a predetermined amount of time (i.e., hydriding parameters) to incorporate hydrogen into the nuclear fuel 20. The hydriding parameters at least partially determine the concentration of the hydrogen in the nuclear fuel 20, such as the hydrogen to hafnium or zirconium ratio of 1.6-1.7. In this regard, hydriding parameters that are known for zirconium hydride may be used to produce the hafnium hydride.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A nuclear fuel composition comprising:
   a transuranic fuel; and
   a neutron moderator including hafnium hydride, mixed with the transuranic fuel, wherein a ratio of hydrogen to hafnium in the hafnium hydride is 1.6-1.7.

2. The nuclear fuel composition as recited in claim 1, including 8 wt %-45 wt % of the transuranic fuel and a balance of the neutron moderator.

3. The nuclear fuel composition as recited in claim 1, further comprising a neutron moderator diluent mixed with the transuranic fuel and the neutron moderator.

4. The nuclear fuel composition as recited in claim 3, wherein the neutron moderator diluent is selected from a group consisting of iron, tungsten, rhenium, and combinations thereof.

5. A nuclear fuel composition comprising:
   8 wt %-45 wt % of a plutonium transuranic fuel; and
   a balance of a neutron moderator mixed with the transuranic fuel, the neutron moderator including hafnium hydride.

6. The nuclear fuel composition as recited in claim 5, wherein the neutron moderator includes a neutron moderator diluent.

7. The nuclear fuel composition as recited in claim 6, wherein the neutron moderator diluent is selected from a group consisting of iron, tungsten, rhenium, and combinations thereof.

8. The nuclear fuel composition as recited in claim 1, wherein the neutron moderator includes an iron neutron moderator diluent.

9. The nuclear fuel composition as recited in claim 1, wherein the neutron moderator includes a tungsten neutron moderator diluent.

10. The nuclear fuel composition as recited in claim 1, wherein the neutron moderator includes a rhenium neutron moderator diluent.

11. The nuclear fuel composition as recited in claim 1, wherein the neutron moderator includes a neutron moderator diluent in an amount greater than an amount of the hafnium hydride.

12. The nuclear fuel composition as recited in claim 5, wherein a ratio of hydrogen to hafnium in the hafnium hydride is 1.6-1.7.

\* \* \* \* \*

UNITED STATES PATENT AND TRADEMARK OFFICE
CERTIFICATE OF CORRECTION

| | | |
|---|---|---|
| PATENT NO. | : 8,000,431 B2 | Page 1 of 1 |
| APPLICATION NO. | : 12/274578 | |
| DATED | : August 16, 2011 | |
| INVENTOR(S) | : Johnson | |

It is certified that error appears in the above-identified patent and that said Letters Patent is hereby corrected as shown below:

ON THE TITLE PAGE:

The Assignee should read as follows:

Item (73)  Assignee: Hamilton Sundstrand Corporation, Windsor Locks, CT (US)

Signed and Sealed this
Tenth Day of April, 2012

David J. Kappos
*Director of the United States Patent and Trademark Office*